US010238037B2

(12) United States Patent
Ubaldi

(10) Patent No.: US 10,238,037 B2
(45) Date of Patent: Mar. 26, 2019

(54) HARVESTING DEVICE FOR AN AGRICULTURAL PRODUCT WITH SORTING MEMBERS COMPRISING A ROTATABLE PORTION

(71) Applicant: ROC S.R.L., Poggio Torriana (RN) (IT)

(72) Inventor: Raffaele Ubaldi, Santa Giustina di Rimini (IT)

(73) Assignee: ROC S.R.L., Poggio Torriana (RN) (IT)

(*) Notice: Subject to any disclaimer, the term of this patent is extended or adjusted under 35 U.S.C. 154(b) by 77 days.

(21) Appl. No.: 15/381,985

(22) Filed: Dec. 16, 2016

(65) Prior Publication Data

US 2017/0181377 A1  Jun. 29, 2017

(30) Foreign Application Priority Data

Dec. 28, 2015 (IT) .............................. 1020150088028

(51) Int. Cl.
*A01D 78/14* (2006.01)
*A01D 80/02* (2006.01)
*A01D 89/00* (2006.01)

(52) U.S. Cl.
CPC ............ *A01D 78/14* (2013.01); *A01D 80/02* (2013.01); *A01D 89/002* (2013.01)

(58) Field of Classification Search
CPC ....... A01F 15/10; A01D 78/14; A01D 78/005; A01D 78/006; A01D 78/008; A01D 78/02;

(Continued)

(56) References Cited

U.S. PATENT DOCUMENTS 2,527,887 A   10/1950  Martin et al.
2,880,564 A *  4/1959  Degenhardt ........... A01D 89/00
                                                        56/364

(Continued)

FOREIGN PATENT DOCUMENTS

CH      680594 A5    9/1992
DE    19927897 A1   12/2000

(Continued)

OTHER PUBLICATIONS

Italian Search Report dated Jun. 30, 2016 from Italian Application No. UB20155071.

(Continued)

*Primary Examiner* — Alicia Torres
*Assistant Examiner* — Adam J Behrens
(74) *Attorney, Agent, or Firm* — Shuttle & Ingersoll, PLC; Timothy Klima

(57) ABSTRACT

A harvesting device for agricultural products having an elongated shape, includes a frame having a main extension direction, a plurality of harvesting elements for agricultural products, each including an elongated harvesting prong, a plurality of bands attached to the frame, arranged along the main extension direction and spaced apart so that each harvesting element is at least partially interposed between two successive bands. A transport path includes a first section, where a prong portion radially outside the band has a constant or increasing size, and a second section, where a prong portion radially outside the band has a decreasing size to a disengagement point. A plurality of sorting members is each associated to a band and positioned below the band, along the second section of the transport path, in which each sorting member is rotatable about its central axis.

13 Claims, 6 Drawing Sheets

(58) Field of Classification Search
CPC ........ A01D 78/04; A01D 78/08; A01D 80/00;
A01D 80/02; A01D 89/002; A01D 89/00;
A01D 89/001; A01D 89/003; A01D
89/006; A01D 89/008; A01D 84/00;
A01D 84/02; A01D 43/04; A01D 43/10;
A01D 57/12; A01D 57/28
See application file for complete search history.

(56) References Cited

U.S. PATENT DOCUMENTS

| | | | |
|---|---|---|---|
| 3,552,923 A | 1/1971 | Carpenter et al. | |
| 3,713,283 A * | 1/1973 | Fritz | A01D 89/002 56/364 |
| 5,052,171 A | 10/1991 | Bich et al. | |
| 5,848,523 A * | 12/1998 | Engel | A01D 89/008 56/341 |
| 6,314,708 B1 * | 11/2001 | Engel | A01F 15/10 198/497 |
| 8,181,435 B1 * | 5/2012 | McClure | A01D 89/002 56/364 |
| 8,240,117 B1 * | 8/2012 | McClure | A01F 15/106 56/341 |
| 9,386,749 B1 * | 7/2016 | Dow | A01D 89/002 |
| 9,426,942 B2 * | 8/2016 | Kappelman | A01D 89/002 |
| 2015/0366138 A1 * | 12/2015 | Kappelman | A01D 89/002 56/364 |

FOREIGN PATENT DOCUMENTS

| | | | |
|---|---|---|---|
| DE | 10021748 A1 * | 11/2001 | ........... A01D 89/002 |
| DE | 102005045987 A1 | 4/2007 | |
| DE | 102013106925 B3 * | 6/2014 | ........... A01D 89/002 |
| DE | 102013106925 B3 | 6/2014 | |
| EP | 0116514 A1 | 8/1984 | |
| EP | 0555836 A2 | 8/1993 | |
| EP | 2006227 A2 | 12/2008 | |
| GB | 2068482 A | 8/1981 | |

OTHER PUBLICATIONS

Italian Search Report dated Sep. 9, 2016 from counterpart IT App No. UB20159718.
European Search Report dated Apr. 28, 2017 from counterpart EP App No. 16198889.4.

* cited by examiner

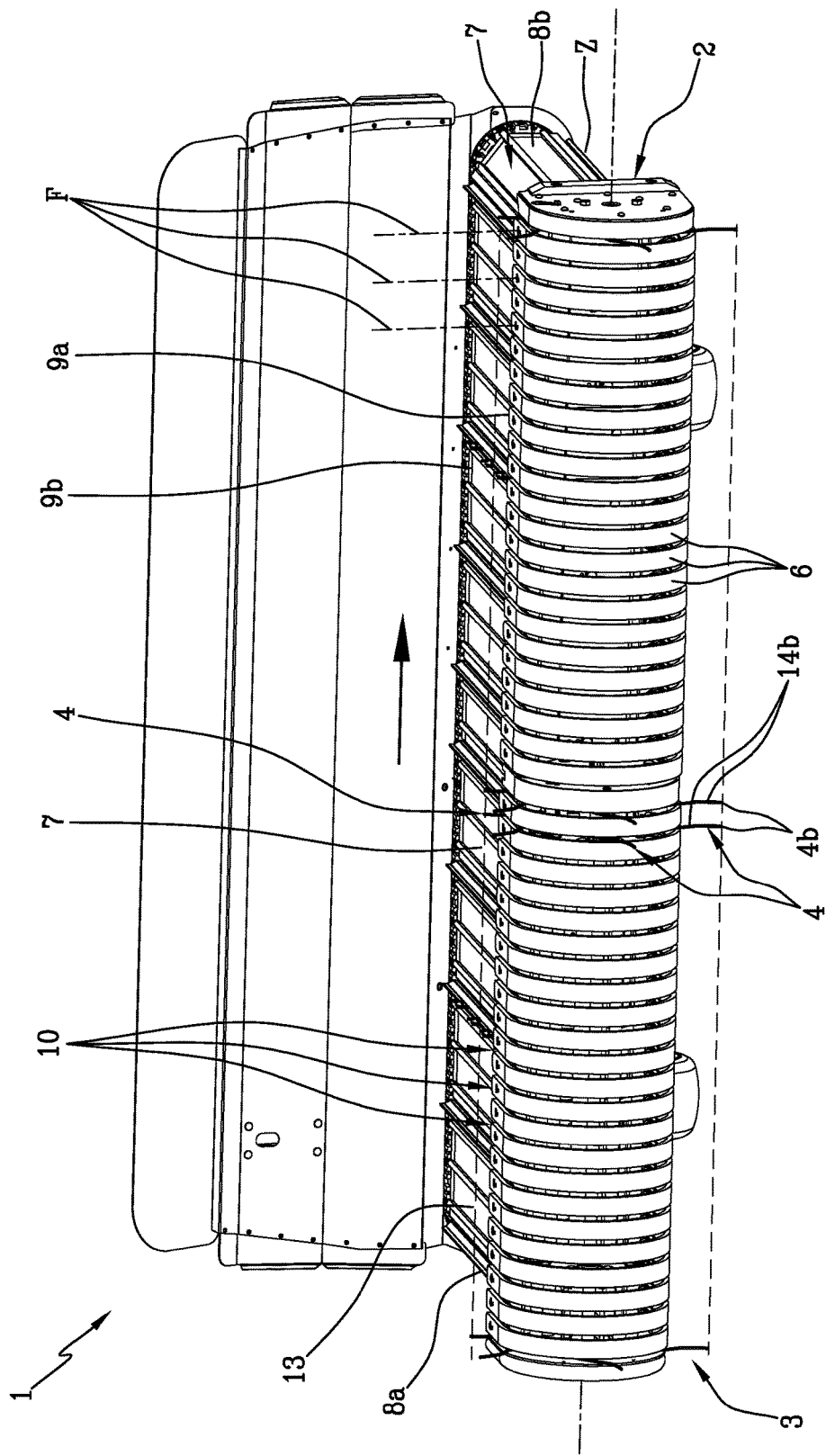

HARVESTING DEVICE FOR AN AGRICULTURAL PRODUCT WITH SORTING MEMBERS COMPRISING A ROTATABLE PORTION

This application claims priority to Italian Patent Application No. 102015000088028 filed Dec. 28, 2015, the entirety of which is incorporated by reference herein.

The present invention relates to a harvesting device for agricultural products having an elongated shape, such as grass, straw, leguminous plants, biomass products and the like.

The harvesting devices are normally used to harvest from the ground grass, straw, hay (cut from other machines) or to harvest leguminous plants; in any case to harvest similar agricultural products (generally vegetable), having an elongated form.

To this end, they are connected to a traction vehicle (such as a tractor or a self-propelled agricultural machine) and are moved by this.

The known harvesting devices have a privileged extension direction which, during use, keeps itself transverse to the displacement direction of the traction vehicle to lift the agricultural products from the ground and move them (before unloading them).

These harvesting devices use a plurality of harvesting elements associated to them and which are moved by a movement system. The movement system is generally driven by a universal joint or the like which, by means of a power take-off, picks the driving force from the engine of the traction vehicle.

Each harvesting element is, in turn, provided with one or more prongs (or springs or rods) arranged side by side. The harvesting elements (and related prongs) are generally arranged around the preferred extension direction along parallel lines with respect to the preferred extension direction itself. Each harvesting element (and the relative prongs) is moved by the movement system along a closed trajectory surrounding the extension direction.

The term prongs generally defines the partially elastic rectilinear elements (also called springs), one end of which is engaged (either directly or through the related harvesting element) to the movement system, while the opposite end is free and radially jutting.

Normally, the device further comprises a plurality of bands fixed to the frame, arranged in succession along the main extension direction and spaced apart so that each harvesting element is at least partially interposed between two successive bands.

Operably arranged downstream of the harvesting elements, such devices (such as swather, press, unloader cutter blower or conditioner) may provide the presence of unloading means of the harvested agricultural products.

Such unloading means are commonly defined by the movement devices such as conveyor belts, catenaries or screw elevators, arranged along the extension direction of the harvesting device and placed in correspondence of a release point of the harvesting elements, in order to transport such products to the sides of the traction vehicle.

Alternatively, operably arranged downstream of the harvesting elements, it may be provided the presence of an operating machine, such as a baler, or a receiving chamber of the harvested agricultural products.

Disadvantageously, the devices of the prior art have problems related to the difficult cleaning of the passage area of the products outgoing from the harvesting elements, namely of the disengagement zone.

In fact, the conformation and movement of the prongs causes in the innermost area, proximal to the hooked end, the accumulation of products, during the ascent, which could subsequently not be properly unloaded.

In fact, firstly, the products loaded in the inner part of the prong risk, during the unloading, to wrap or get stuck in correspondence of the end of the band (fixed to the frame).

Moreover, the products lying too far inside the prong risk to completely follow this element in its recirculating path, missing the unloading means and therefore going to clog the recirculating zone of the harvesting members, or in any case to accumulate in a "dead point" of the movement system.

In this respect, object of the present invention is to make available a harvesting device for agricultural products having an elongated shape, such as grass, straw, leguminous plants, biomass products and the like which overcomes the drawbacks of prior art mentioned above.

More specifically, it is object of the present invention to make available a harvesting device for agricultural products having an elongated shape, such as grass, straw, leguminous plants, biomass products and the like which is highly performing and easier to maintain.

Moreover, another object of the present invention is to manufacture a harvesting device for agricultural products having an elongated shape, such as grass, straw, leguminous plants, biomass products and the like which minimizes the risk of jamming and the operations of maintenance or cleaning by the operator.

Said aims are achieved by a harvesting device for agricultural products having an elongated shape, such as grass, straw, leguminous plants, biomass products and the like having the features of one or more of the following claims, i.e. by a device comprising a frame having a main extension direction which, during use, keeps itself transverse to the displacement direction of the movement means, a plurality of harvesting elements for agricultural products, each in turn provided with at least one elongated harvesting prong, a movement system for each of the harvesting elements in a plane of movement along a closed trajectory surrounding the main extension direction, in which the closed trajectory includes a transport path for the agricultural product between a loading point of the product from the soil by the elongated prongs and a disengagement point of the agricultural product from the prongs, a plurality of bands attached to the frame, arranged in succession along said main extension direction and spaced apart so that each harvesting element is at least partly interposed between two successive bands.

The transport path is divided into a first section, in which a prong portion radially outside the band has a constant or increasing size, and a second section, in which a prong portion radially outside the band has a decreasing size to the disengagement point.

According to an aspect of the present invention, the device comprises a plurality of sorting members, each associated with a respective band and positioned, internally to the band, along the second section of the transport path.

In this text, the expression "internally to the band" defines the association of the sorting member to a concave side (or concave face) of the band.

According to a further aspect of the invention, preferably, each sorting member is rotatable about its central axis.

Advantageously, the presence of a rotatable member positioned in this way allows to intercept the products and sort them.

Preferably, moreover, the central axis of each sorting member is transverse to the section of the transport path in which it is positioned and substantially aligned with the plane of movement of the harvesting element.

In order to maximize the effect, preferably the sorting members are each positioned in correspondence of the disengagement point of the respective feed path.

Moreover, preferably, each sorting member comprises a plurality of sliding bodies shaped to define a supporting plane and/or a sliding plane for the harvested products.

More precisely, each sliding body is defined by a plate having a portion for receiving the products which is, with reference to the feed path of the prongs, in front of a rotatable section of the sorting member.

Therefore, the plate protrudes frontally to the rotatable portion (e.g. bearing), below it to accommodate and support the products carried by the inner portion of the prong before it is started in the recirculation portion of its path.

However, these and other characteristics, with related advantages, will be clearer from the following exemplary, and therefore not limiting, description of a preferred, and therefore not exclusive, embodiment of a harvesting for agricultural products having an elongated shape such as grass, straw, leguminous plants, biomass products and the like as illustrated in the appended figures, in which:

FIG. 5 is an overall perspective view of a harvesting device for agricultural products having an elongated shape, such as grass, straw, leguminous plants, biomass products and the like according to the present invention.

Figure 1:
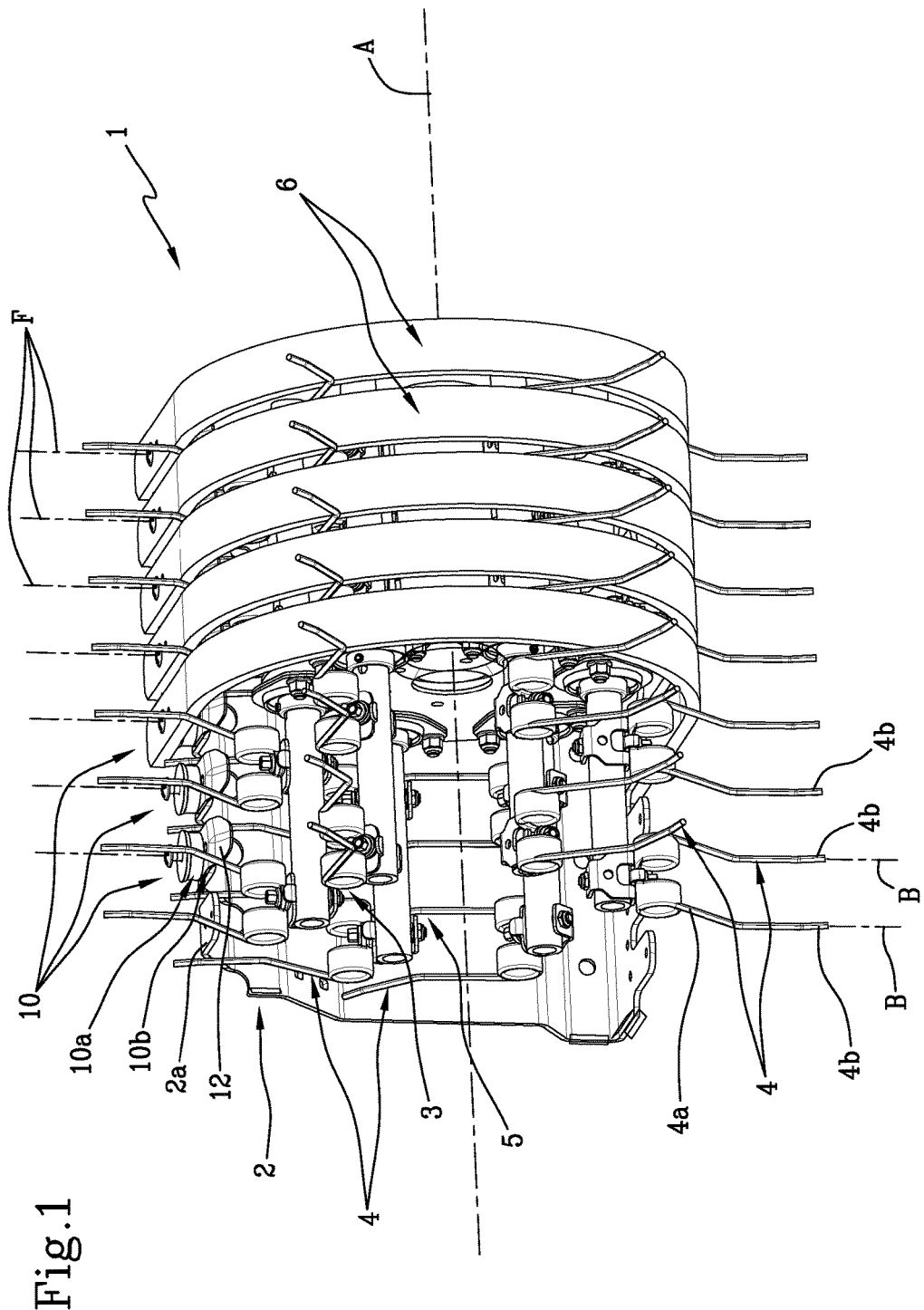
FIGS. 1 and 2 are perspective views of a portion of a harvesting device for agricultural products having an elongated shape, such as grass, straw, leguminous plants, biomass products and the like according to the present invention, without some parts in order to highlight other parts.
Figure 2:
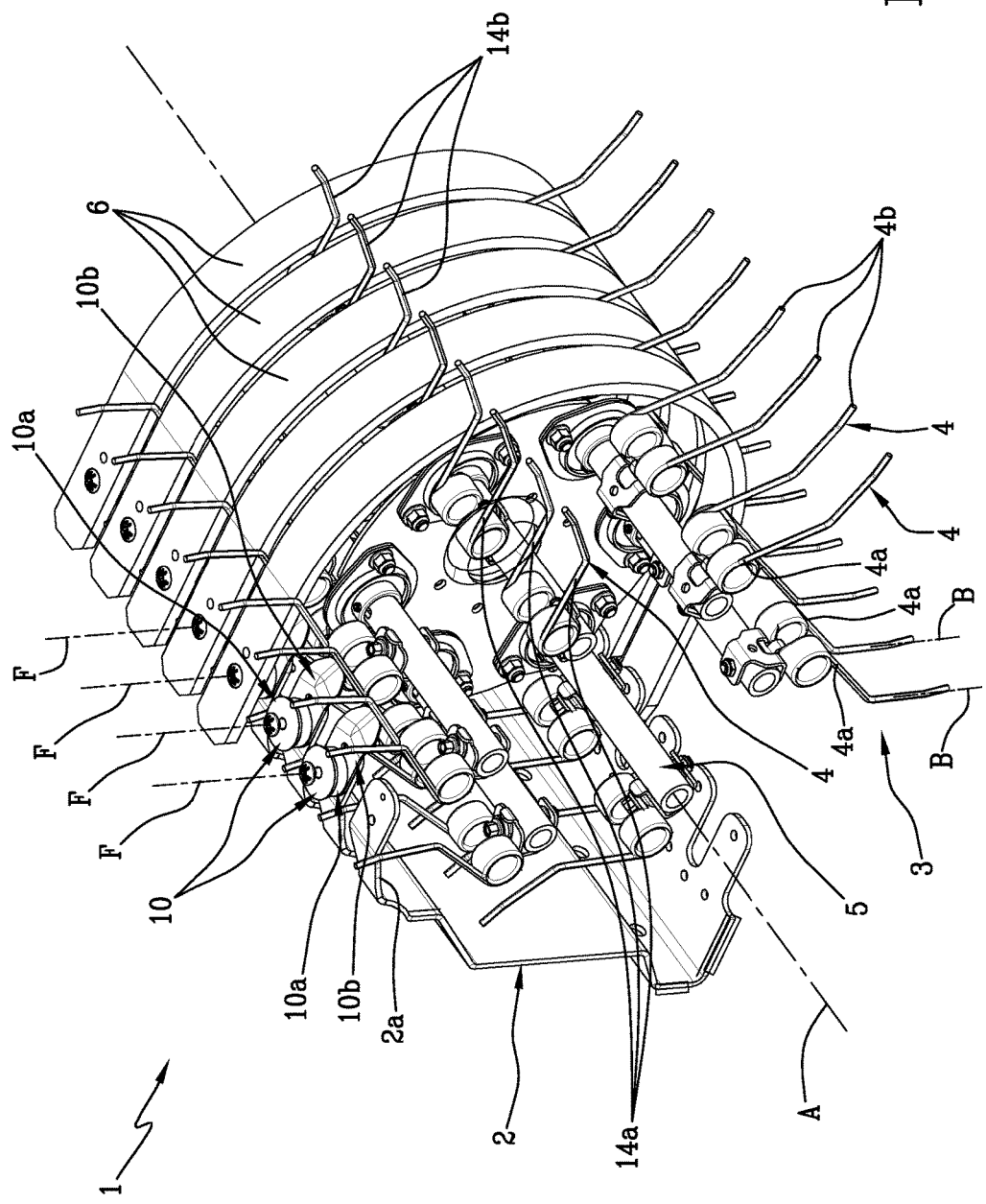
Figure 3:
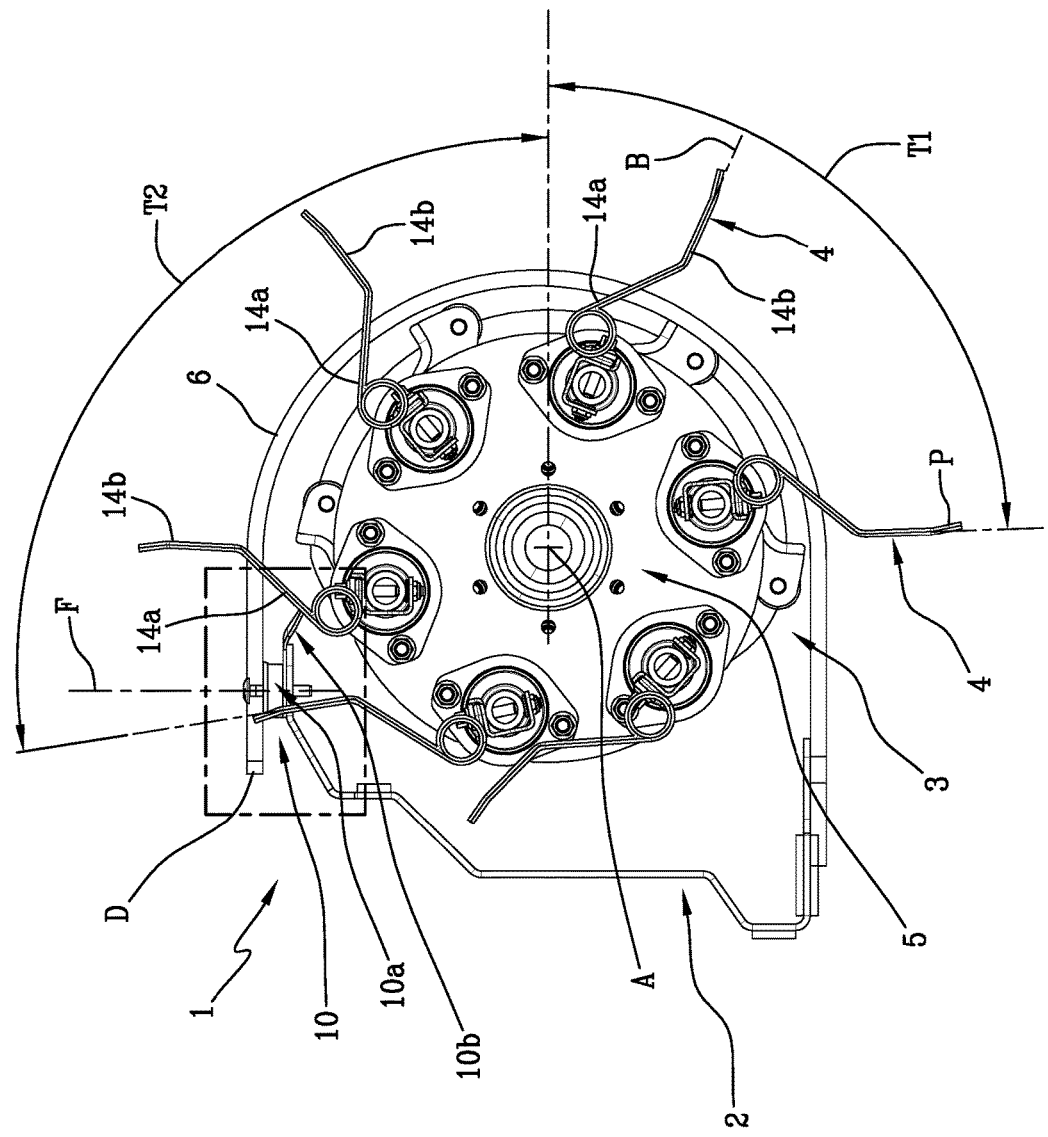
FIG. 3 shows a side view of the device of FIG. 1 with some parts removed in order to highlight others.
Figure 3A:
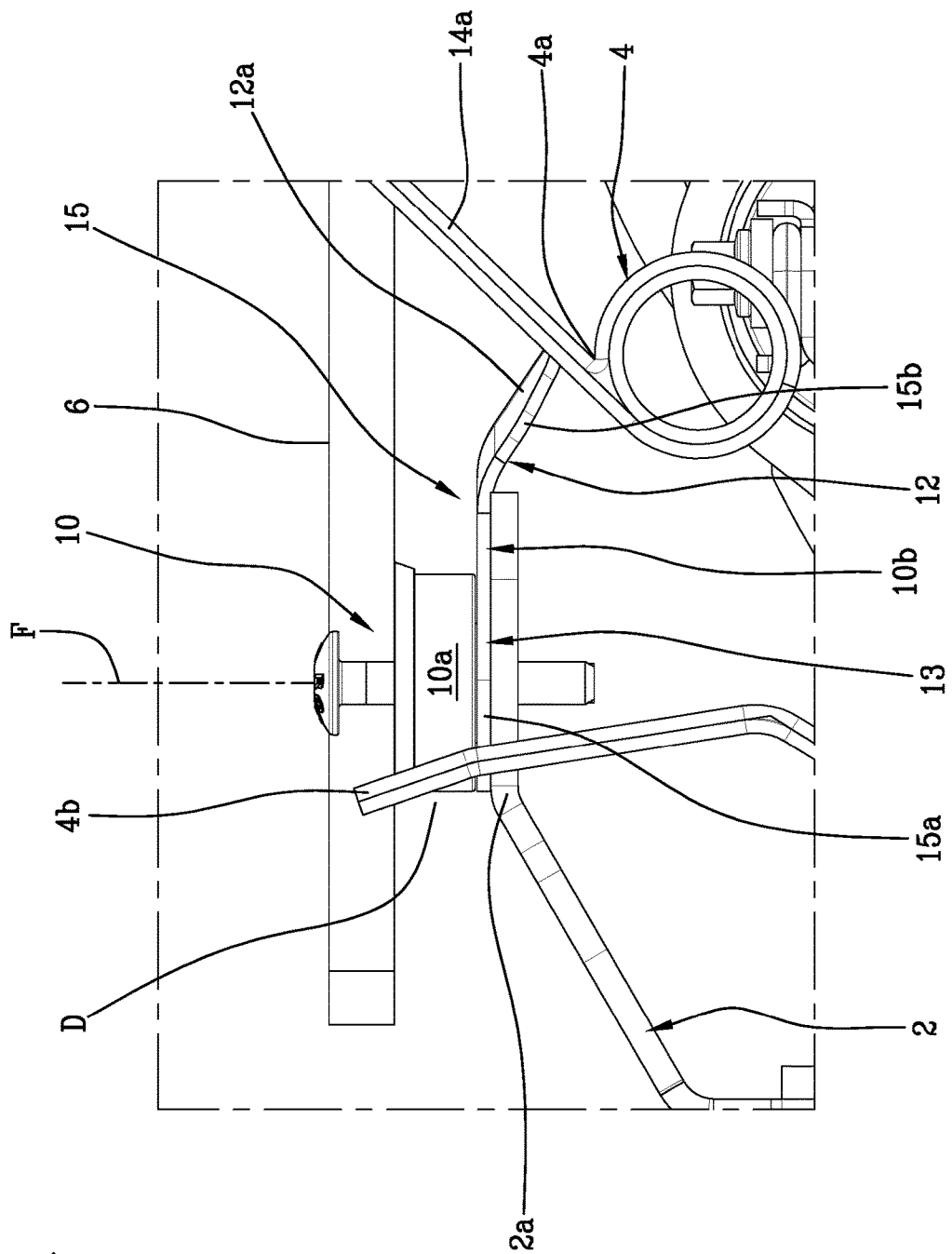
FIG. 3a shows a detail of FIG. 3
Figure 4:
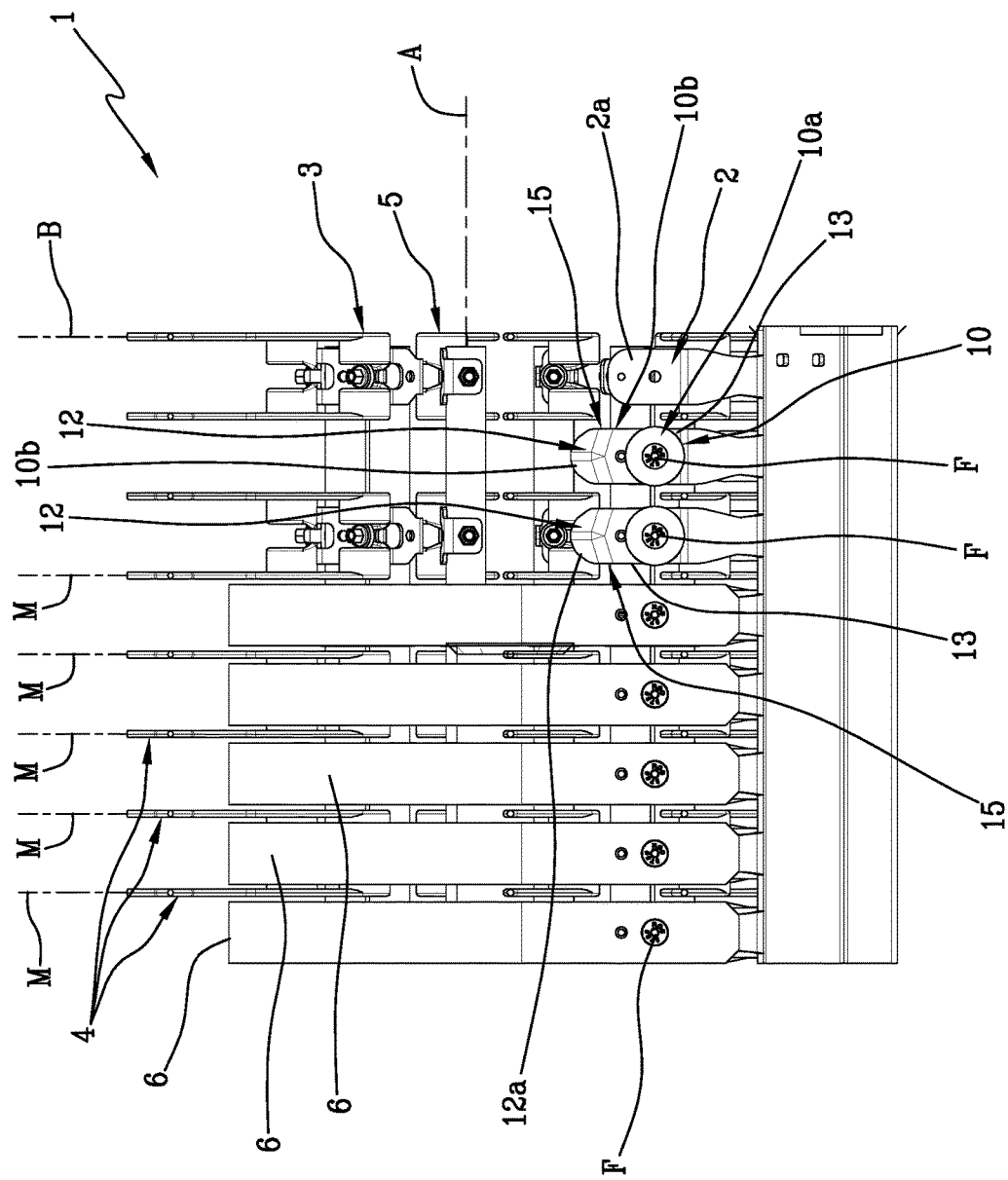
FIG. 4 shows a top view of the device of FIG. 1 with some parts removed in order to highlight others.

With reference to the appended figures, number 1 indicates a harvesting device for agricultural products having an elongated shape, such as grass, straw, leguminous plants, biomass products and the like.

The harvesting device 1 is a machine moved by a movement means along a stock path of a plurality of agricultural elongated products, preferably slender, such that the harvesting device 1 is configured to lift them from the ground by means of appropriate harvesting elements transporting them, on appropriate unloading means or within a receiving chamber, through a special movement system.

More specifically, the device comprises a frame 2 having a main extension direction "A" which, during use, keeps itself transverse to the displacement direction of the movement means. Such frame preferably comprises attachment means (not shown) with the traction means jutting transversely, preferably orthogonally, to the extension axis "A".

The device 1 further comprises a plurality of harvesting elements 3 for agricultural products, each in turn provided with at least an elongated harvesting prong 4.

Note that the harvesting elements 3 are arranged in succession along the extension axis "A" (spaced apart, preferably equally spaced).

Preferably, each harvesting element 3 comprises a plurality of elongated prongs 4 (i.e. forks) extending along an extension trajectory "B" between a first end 4a and a second end 4b.

Preferably, the trajectory "B" is not linear, but it defines a broken line or a curve divided into at least two sectors, respectively angled, and functionally distinct.

These prongs 103 are preferably arranged around the same central axis of rotation, radially oriented to it like a spoke.

Note in fact that the term "prong" is intended to define, in this text, an elongated body or a wand radially projecting to the device 1, with respect to the extension axis "A", to lift the products from the ground and load them on the device.

In this regard, the harvesting device 1 comprises a movement system 5 of each harvesting element 3 along a closed trajectory surrounding the main extension axis "A" (corresponding to the abovementioned central axis).

More precisely, the movement system 5 is configured to rotate the prongs 4 (also eccentrically) about said extension axis "A" in a predetermined plane of movement "M".

Therefore, each prong 4 presents the first end 4a connected to the movement system 5 in a zone close to the axis "A" and the second end 4b jutting away from it.

Therefore, this system 5 comprises at least a rotation shaft arranged along said extension axis "A" of the frame 2 and actuating means connected to it.

Such actuation means may be electric, hydraulic, or defined by a transmission system connected to the source of power of the movement means (e.g. by means of a universal joint).

Therefore, the closed trajectory comprises a transport path of the agricultural product between a loading point "P" of the product from the ground by the elongated prongs 4 and a disengagement point "D" of the agricultural product from the prongs 4.

In other words, each harvesting element 3 defines during its movement (imparted by the system 5) a closed trajectory having at least one loading point "P", in use at a lower level proximal to the ground, and at least one disengagement point "D", in use at a higher level, distal from the ground.

Note that the path of each prong 4 from the loading point "P" to the disengagement point "D", is substantially a transport path, while the path of each prong 4 from the disengagement point "D" to the loading point "P" it is substantially a recirculating (or return) path.

Preferably, the loading points "P" of the harvesting elements 3 are aligned to each other along a direction parallel to the extension axis "A"; therefore, they define a pick line.

Similarly, the disengagement points "D" of the harvesting elements 3 are aligned to each other along a direction parallel to the extension axis "A"; therefore, they define a disengagement or release line.

The harvesting device 1 further comprises a plurality of bands 6 fixed to the frame 2, arranged side by side along said main extension axis "A" and spaced apart so that each harvesting element 3 is at least partially interposed between two successive bands 6. In the illustrated (and preferred) embodiment, each band 6 is in fact placed between two consecutive elongated prongs 4 along the extension axis "A".

Between two consecutive bands 6, a space for the free movement of each elongated prong 4 is formed along the trajectory.

Therefore, each plane of movement "M" of a harvesting element 3 is interposed between two adjacent bands 6.

Each prong 4 of the harvesting elements 4 thus presents the first end 4a connected internally to the band 6 in a zone close to the axis "A" and the second end 4b which, at least during the transport path, is placed in a radially external zone with respect to the band 6.

More precisely, each prong 4 thus has a connecting portion 14a, extending from the first end 4a internally to the bands 6, and an active portion 14b, jutting externally to the bands 6 between the connecting portion 14a and the second end 4b, at least during the transport path.

These bands 6 thus define a sliding and supporting surface of products harvested and transported by the active portion 14b of the prongs 4.

In other words, the bands 6 limit the amount of products which "falls" within them, in the vicinity of the movement system 5.

These bands therefore define an external "portion" 1a of the device 1 from its "internal" portion.

Note that in this regard, it is possible to divide the transport path of the harvesting elements 3 into a first section 'T1', in which a prong 4 portion radially outside the band 6 has a constant or increasing size, and a second section "T2", in which a prong 4 portion radially outside the band has a decreasing size to the disengagement point "D".

Consequently, in the first section 'T1', the distance between the second end 4b of a prong 4 and the two adjacent bands 6 (i.e. their convex face) is constant or increasing, while in the second section "T2" this distance decreases stepwise.

Proximally to the disengagement point "D", the movement system 5 is configured to fully retract the prong 4 within the bands 6; from that point on, the recirculating path substantially starts.

Structurally, the bands 6 are defined by curved elements shaped so as to surround the extension axis "A" at least in correspondence of the transport path of the prongs 4 (i.e. of the closed trajectory).

Preferably, the bands 6 comprise substantially plan slats or strips curved around the axis "A" and fixed to the frame in correspondence of the respective ends.

Therefore, each band 6 has a concave inner face and a convex outer face. In other words, the bands 6 are arc shaped elements developing from a lower end portion 6a, used at a lower level with respect to the axis "A", and an upper end portion 6b, used at a higher level with respect to the axis "A". Preferably, the harvesting device 1 comprises unloading means 7 for the harvested agricultural products, arranged downstream of the harvesting elements 3 (in particular, downstream of the disengagement point "D") configured to transport the agricultural products away from said disengagement points "D" so as to convey the harvested products in a predetermined unloading zone.

Therefore, the unloading means 7 can be configured to laterally move the products (e.g. conveyor belt or screw elevator), posteriorly (e.g. rake, belt, etc . . . ) or upwards (e.g. palette, fork, etc . . . ).

In the illustrated embodiment, the unloading means 7 define a supporting plane "B" for the harvested agricultural products and are movable along the main extension axis "A" to release agricultural products on the sides of said movement means.

Consequently, the extension axis "A" is a movement direction of the unloading means 7.

In the preferred embodiment, the unloading means 7 comprise a conveyor belt 7a operatively placed downstream of the harvesting elements 3 and defining the supporting plane "B" for the harvested agricultural products.

In particular, the conveyor belt 7a defines a supporting plane "B" movable along the direction "A" to release the agricultural products on the sides of the device.

Note that the term "conveyor belt" means any cyclic movement apparatus, able to define a mobile supporting plane for the products, such as a catenary, a crawler or the like.

The conveyor belt 7a (i.e. the unloading means 7) develops along the axis "A" between a first end 8a and a second end 8b, opposite the first 8a.

In the illustrated embodiment, the unloading means 7 are configured to move the products, on the supporting plane "B", from the first 8a towards the second end 8b, which, in use, defines an unloading zone "Z" of the agricultural products.

Therefore, the conveyor belt 7a defines a mobile supporting plane "B" for the agricultural products from the first end 8a towards the second end 8b.

Furthermore, such a conveyor belt 7a (i.e. the unloading means 7) develops between a first longitudinal edge 9a, associated to the harvesting means 3 to receive the harvested agricultural products, and a second longitudinal edge 9b opposite to the first 9a.

Therefore, the products moving along the transport path cross the first edge 9a to pass from the harvesting elements 3 to the unloading means 7. In alternative embodiments, the unloading means have other shape and/or function.

For example, the unloading means may be defined by a screw elevator.

In this case, the "first longitudinal edge 9a" is defined by the outer periphery of the screw elevator proximal to the disengagement point "D".

In a further alternative, the unloading means are associated to an operating machine, operatively placed downstream of the harvesting elements (e.g. roto-packing device), and therefore they are configured to convey the products away from the disengagement point "D", toward the operating machine itself.

According to one aspect of the present invention, the device 1 further comprises a plurality of sorting members 10, each interposed between two consecutive harvesting elements 3, associated to a respective band 6 and configured to prevent the accumulation of products over said band.

Preferably, each sorting member 10 is positioned below the respective band (i.e. internally to it), along the second section "T2" of the transport path.

Advantageously, in this way, the products which, during the transport, fall into the connecting portion 14a of the prong 4, over a band 6, are intercepted by the sorting member 10 and diverted towards the disengagement point "D".

More precisely, each sorting member 10 is configured to intercept the products and to facilitate their movement towards the feed area of one of the two adjacent harvesting elements 3.

In this respect, preferably, each sorting member 10 is at least partially rotatable about its central axis "F".

Preferably, this central axis "F" is transverse to the section of the transport path in which it is positioned and is substantially aligned with the planes of movement of the adjacent harvesting elements 2.

In the preferred embodiment, the central axis "F" is substantially vertical (or, at most, slightly inclined ±20° with respect to the vertical axis).

In this way, the presence of the sorting member 10 allows to intercept those products that would otherwise fall into a "dead point" of the movement system 5 (recirculating path) and its ability to rotate means that it does not wrap around to the member itself, but is disposed by one of the two harvesting elements 3.

In the illustrated embodiment, the sorting members 10 are each positioned in proximity (correspondence) of the disengagement point "D" of the respective transport path.

Advantageously, in this way, the products "overlapping" the sorting member 10 are dragged and moved by the two harvesting elements 3 adjacent to it and by the immediately consecutive unloading means, maximising the efficiency thereof.

Additionally, each sorting member 10 comprises a sliding body 10b shaped to define a supporting plane and/or a sliding plane for the harvested products.

Therefore, the sorting member 10 comprises a rotatable portion 10a associated to the band 6 (i.e. the concave face) and a sliding body 10b bound to the rotatable portion 10a and spaced from the band 6 by the rotatable portion 10a.

Note that, in the preferred embodiment, the rotatable portion 10a is freely rotatable, i.e. idle.

However, in certain alternative embodiments, not illustrated, the rotatable portion 10a may be motorized.

More precisely, the rotatable portion 10a of each sorting member 10 extends along said central axis "F" between a face 11a proximal to the band 6 and a face 11b distal from the band 6.

Preferably, the rotatable portion 10a presents a prismatic shape, more preferably cylindrical or disc-shaped.

In order to maximize the efficiency of the sorting member 10, the rotatable portion 10a has a maximum transverse dimension (i.e. the diameter) of at least ¼ of the distance, measured on the extension axis "A", between two adjacent harvesting elements 3.

Preferably, this transverse dimension (or diameter) is equal to at least ⅓ of the distance, measured on the extension axis "A", between two adjacent harvesting elements 3.

In the illustrated embodiment, the ratio between the transverse dimension of the sorting member 10 (or diameter of the rotatable portion 10a) and the distance between the two harvesting elements 3 within which it is placed is about 0.72.

In the preferred embodiment, the rotatable portion 10a is defined by a bearing or the like.

Alternatively, note that the rotatable portion 10a may comprise a plurality of rotatable elements, stacked or placed side by side.

The sliding body 10b is connected to the rotatable portion 10a in correspondence of the distal face 11b.

Therefore, the rotatable portion 10a is interposed between the respective band 6 and the sliding body 10b.

Therefore preferably, each sorting member 10, comprising both the rotatable portion 10a and the sliding body 10b, is interposed (packed) between a band 6 and the frame 2.

In this regard, the frame 2 is preferably provided with a plurality of overhangs 2a on each of which a sliding body 10b is fixed.

Preferably, each sliding body 10b comprises a receiving portion 12 of the products, with reference to the transport path of the prongs 3, in front of the respective rotatable portion 10a.

This position, in front of the rotatable portion, is therefore placed so as to be affected by the prongs 4 before the rotatable portion.

Therefore, the receiving portion 12 is jutting frontally to the rotatable portion 10a, preferably along a direction orthogonal to the direction "A".

Note that, preferably, the receiving portion 12 comprises at least one curved or angled free end 12a defining an invitation or ramp for the products transported by the prongs 3.

Therefore, the free end 12a of the receiving portion 12 is inclined away from the respective wing 6 so as to increase the passing light and to facilitate the reception of the products on the sorting member 10.

The sliding bodies 10b comprise a connecting portion 13 to which the receiving portion 12 is rigidly fixed and jutting.

On the connecting portion 13 the rotatable portion 10a of the sorting member is rotatably coupled.

In the illustrated embodiment, the sliding bodies 10b are each defined by a plate 15 provided with a flat half-part 15a, defining the connecting portion 13, and by a curved or inclined half-part 15b, defining the receiving portion 12.

Therefore, the connecting portion 13 and the receiving portion 12 are integrally formed.

With reference to an embodiment, alternative or complementary to that described so far, the rotatable portion 10a of the sorting members 10 is positioned so that its periphery is partially proximal to the second longitudinal edge 9b of the conveyor belt 8 with respect to the first longitudinal edge 9a.

In other words, in this embodiment, the rotatable portion has a greater radius (or, anyway, a transverse dimension) than a distance between the first longitudinal edge 9a of the conveyor belt 8 and said central axis "C".

Therefore, according to this aspect of the invention, the sorting members 10, and in particular the rotatable portion, are placed over the first longitudinal edge 9a of the conveyor belt 8.

Advantageously, in this way, the rotatable portion 10a defines a guiding body for the products being transported by the conveyor belt, facilitating their flow towards the unloading zone and avoiding their jam in the bands 6.

In a further alternative embodiment, the sorting members 10 do not have a rotatable portion, but a rounded body irremovably bound (preferably integrally formed) to the sliding bodies.

Therefore, in this embodiment, these members are sliding members, each associated to a band 6 and positioned below said band 6 along the second portion "T2" of the transport path, preferably in the disengagement point "D".

Each sliding member comprises a sliding body 10b configured to define a support and/or sliding plane for harvested products and a spacer 10a placed near the disengagement point "D" and interposed between the respective band 6 and the sliding body 10b.

The spacer 10a is thus a substantially disc-shaped portion rigidly fixed to the sliding body 10b.

Advantageously, said embodiment allows to avoid the fall of the products into the "dead zone" of the movement system 5, guiding the sliding of such products towards the disengagement point "D".

Preferably, the sliding bodies 10b comprise a receiving portion 12 similar to the previously described one, jutting frontally to the spacer 10a and provided with at least one curved or angular free end 12a defining a guide or ramp for products conveyed by the prongs 4.

Therefore, subject to the features linked to the rotation of the rotatable portion, all the other features of shape, size or positioning associated with the sorting members 10 may also be applied to the sliding members described herein.

The invention achieves the intended objects and achieves important advantages.

In fact, the presence of the sorting members prevents the accumulation of products in the dead zones of the path of the prongs or over the bands, thus reducing the need for maintenance and/or cleaning of the device.

Moreover, the presence of a sliding body of the products, which prevents their fall and guides them towards the disengagement zone, maximizes the efficiency of the device, preventing the harvested products from falling on the ground outside of the swaths.

Moreover, the use of bearings placed beneath the bands makes the upgrade of the device simple, economic and unobtrusive with respect to the original structure of the device.

The invention claimed is:

1. A harvesting device for an agricultural product having an elongated shape, comprising:
   a frame having a main extension direction;
   a plurality of harvesting elements for the agricultural product, each of the plurality of harvesting elements including an elongated harvesting prong;
   a movement system for moving each of the plurality of harvesting elements in a respective plane of movement along a closed trajectory surrounding the main extension direction, wherein the closed trajectory includes a transport path for the agricultural product between a loading point of the agricultural product from a soil by the elongated harvesting prongs and a disengagement point of the agricultural product from the elongated harvesting prongs, wherein the main extension direction is, during operation of the harvesting device, transverse to the transport path;
   a plurality of bands attached to the frame, arranged in succession along the main extension direction and spaced apart so that at least one of the plurality of harvesting elements is at least partly interposed between two successive ones of the plurality of bands; the transport path being divided into a first section, in which a prong portion positioned radially outside the two successive ones of the plurality of bands has a constant or increasing size, and a second section, in which the prong portion positioned radially outside the band has a decreasing size to the disengagement point;
   a plurality of sorting members, each associated with one of the plurality of bands, respectively and positioned below the one of the plurality of bands, along the second section of the transport path, wherein each of the plurality of sorting members has a central axis and is at least partly rotatable about the central axis and wherein each of the plurality of sorting members comprises a rotatable portion which:
      extends along the central axis between a face proximal to the one of the plurality of bands and a face distal from the one of the plurality of bands, and
      is configured to rotate about the central axis during operation of the harvesting device.

2. The harvesting device according to claim 1, wherein the plurality of sorting members is positioned transverse to the second section of the transport path and adjacent the respective plane of movement.

3. The harvesting device according to claim 1, wherein the plurality of sorting members are positioned each at the disengagement point of the respective transport path.

4. The harvesting device according to claim 1, wherein each of the plurality of sorting members comprises a sliding body distal from the one of the plurality of bands relative to the rotatable portion and is configured to define at least one chosen from a support and a sliding plane for the agricultural product.

5. The harvesting device according to claim 4, wherein the sliding body comprises a receiving portion for receiving the agricultural product, the receiving portion protruding frontally from the rotatable portion and including at least one curved or angular free end defining a guide or ramp for the agricultural product conveyed by the elongated harvesting prongs.

6. The harvesting device according to claim 5, wherein the sliding body is defined by a plate having a planar half-part, defining a connecting portion on which the rotatable portion is pivoted, and by a curved or slanted half-part defining the receiving portion.

7. The harvesting device according to claim 1, wherein each of the plurality of sorting members has a maximum transversal dimension of at least ¼ of a distance, measured along the main extension direction, between two adjacent ones of the plurality of harvesting elements.

8. The harvesting device according to claim 1, wherein each of the plurality of sorting members includes a cylindrical or disc-shaped rotatable portion having a respective base pivoted to the one of the plurality of bands and to a sliding body.

9. The harvesting device according to claim 1, wherein the plurality of sorting members are motorized.

10. The harvesting device according to claim 1, further comprising an unloading device operably arranged downstream of the plurality of harvesting elements, near the disengagement points and movable away from the disengagement points to convey the agricultural product to a predetermined unloading zone.

11. The harvesting device according to claim 1, wherein the rotatable portion of each of the plurality of sorting members is freely rotatable about the central axis.

12. The harvesting device according to claim 1, wherein the agricultural product having an elongated shape includes at least one chosen from grass, straw, leguminous plants, and biomass products.

13. The harvesting device according to claim 1, wherein each of the plurality of sorting members has a maximum transversal dimension of at least ⅓ of a distance, measured along the main extension direction, between two adjacent ones of the plurality of harvesting elements.

* * * * *